US006958998B2

(12) United States Patent
Shorey

(10) Patent No.: US 6,958,998 B2

(45) Date of Patent: Oct. 25, 2005

(54) TRAFFIC MANAGEMENT IN PACKET-BASED NETWORKS

(75) Inventor: Rajeev Shorey, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 733 days.

(21) Appl. No.: 09/901,229

(22) Filed: Jul. 9, 2001

(65) Prior Publication Data

US 2003/0007454 A1 Jan. 9, 2003

(51) Int. Cl.[7] ............................................ H04L 12/56

(52) U.S. Cl. ................................ 370/395.42; 370/412

(58) Field of Search ............................... 370/229, 230, 370/235, 253, 349, 386, 389, 396, 413, 395.21, 370/395.41, 395.43, 428, 252, 412, 395.4, 370/395.42, 429

(56) References Cited

U.S. PATENT DOCUMENTS 5,224,099 A 6/1993 Corbalis et al.
6,760,309 B1 * 7/2004 Rochberger et al. ........ 370/235

OTHER PUBLICATIONS

W.R. Stevens, "TCP/IP Illustrated, vol. 1", Addison-Wesley, 1997, 3 pages.

L.L. Peterson & B.S. Davie, "Computer Networks: A Systems Approach", Morgan Kaufmann publishers, 2000, 2 pages.

S. Floyd and V. Jacobson, "Random Early Detection Gateways for Congestion Avoidance", IEEE/ACM Transactions on Networking, vol. 1, No. 4, Aug. 1993, 397-413.

D. Lin and R. Morris, "Dynamics of Random Early Detection", SIGCOM 1997.

F. M. Anjum and L. Tassiulas, "Balanced-RED: An Algorithm to Achieve Fairness in the Internet", Technical Research Report, Mar. 8, 1999.

F. M. Anjum and L. Tassiulas, "Fair Bandwidth Sharing Among Adaptive and Non-Adaptive Flows in the Internet", Proceedings of IEEE INFCOM 1999, 9 pages B. Suter, T.V. Lakshman, D. Stiliadis, A. Choudhury, "Efficient Active Queue Management for Internet Routers", Proc. INTEROP 1998 Engineering Conference, pp. 1-21.

S. Blake, D. Black, M. Carlson, E. Davies, Z. Wang, W. Weiss, "An Architecture for Differentiated Services", Request for Comments 2475, Dec. 1998, pp. 1-32.

* cited by examiner

*Primary Examiner*—Wellington Chin
*Assistant Examiner*—Brenda Pham
(74) *Attorney, Agent, or Firm*—McGinn & Gibb, PLLC; T. Rao Coca, Esq.

(57) ABSTRACT

Providing packet-based service differentiation on packet-based networks involves first determining information associated with packets as a basis for inferring connection characteristics associated with the respective packet, as the packets pass though a particular network node. Statistical measures based on numerical values of, for example, Round Trip Time (RTT), is used to characterize connections as being, in this case "long" or "short". "Long" connections are given a higher priority than "short" connections. Accordingly, the assigned priority associated with particular packets can be used to adjust drop probabilities for those packets.

28 Claims, 3 Drawing Sheets

TRAFFIC MANAGEMENT IN PACKET-BASED NETWORKS

FIELD OF THE INVENTION

The invention relates to traffic management in packet-based networks and relates particularly to the provision of packet-based service differentiation in packet-based networks.

BACKGROUND

For a telecommunications network such as an ATM network, U.S. Pat. No. 5,224,099 issued to Corbalis et al on 29 Jun. 1993 discloses a method of queuing and servicing of cell traffic. The described techniques attempt to provide a fair servicing regime that satisfactorily handles different classes of traffic (voice, data etc) which have different quality-of-service priorities, in terms of delay and loss sensitivity.

Corbalis et al draw a distinction between bursty and non-bursty cell traffic. Bursty cell traffic is placed in one of a number of subqueues according to a hopcount associated with the respective cell. Each subqueue has a different servicing priority. Minimum bandwidths are respectively allocated to bursty and non-bursty traffic, and spare bandwidth is allocated to cell traffic according to a predefined priority scheme. The use of hopcount information (discussed in Corbalis et al), generally, has no bearing on the underlying congestion on the network. Accordingly, the use of hopcount information, as disclosed in Corbalis et al, does not provide a particularly advantageous way in which to address network congestion.

In packet-based computer networks, one widely used congestion avoidance algorithm is referred to as RED (Random Early Drop). According to this algorithm, the network drops packets when the average queue length at a network node, such as a router, is within a predetermined range.

The operation of RED and related algorithms is probabilistic and stateless, as packets are indiscriminately dropped at a certain rate, depending on the current average queue length. This approach is relatively unsophisticated, and accordingly does not make optimal use of network resources.

The above described existing techniques do not adequately or, in all cases, appropriately conserve network resources. Accordingly, a clear need exists for an improved manner of handling network traffic which at least attempts to address these and other limitations associated with existing techniques.

SUMMARY

Packet-based traffic management in packet networks can be advantageously improved by using information associated with individual packets. Packets are implicitly differentiated into connections of different types, based on information derived from the individual packets. It may be considered that fields associated with individual packets explicitly or implicitly convey connection characteristics associated with that packet. Connections are distinguished into different types based on a measure (a metric or a characteristic) that at least partly reflects the duration (for example, end-to-end packet delay) of packet transmission associated with the connection.

A connection characteristic can be inferred from a field which has a numerical value representative of a particular metric. It is preferred that this representative value be correlated with the amount of network resources consumed by the respective packet in the packet-based network.

For TCP/IP networks, one such field that can be used is the value of RTT (Round Trip Time). This value, if explicitly included in the packet header information for IP packets, estimates the round trip time associated with the packet as it travels between source and destination, and as the corresponding acknowledgment returns from the destination back to the source.

Other measures can also be additionally used, either taken directly from packet header information values, or derived therefrom. For example, hopcount may be used as a representative value which is combined with duration information such as RTT. In a TCP/IP network, hopcount can be determined by comparing the current value for the TTL (Time to Live) field in the packet header information with the initial TTL value.

It is recognised that RED routers/gateways are inherently biased against packet flows with a large RTT. Accordingly, at congested network nodes, dropping packets from long connections (that is, with high RTT) adversely affects the throughput associated with the packet flow of such connections, more so than for shorter connections. Further, long connections consume correspondingly greater network resources than short connections and, as a result, there is greater wastage of network resources if packets from long connections are dropped. In this context, long connections can be thought of as being characterised by a large RTT value and, additionally, a relatively high "hopcount".

Statistical measures of these values are typically maintained, so that individual packets can be classified as having, for example, below average or above average values.

More sophisticated metrics, which take into account one or more such values, can be derived and applied accordingly. For example, hopcount and RTT may be combined in a predetermined manner to provide an empirically representative measure of the amount of network resources consumed by particular packets, for a given type of network topology and traffic flow characteristics. Hopcount and RTT can for some networks provide a generally reliable indication of the characteristics of a connection with which the packet is associated.

A fair and efficient regime for queuing packets through a network node allows for improved network usage. The priority of packets is adjusted at network nodes in response to information associated with packets which implies certain connection characteristics, and the packet drop probability correspondingly adjusted, based on the assigned priority of the packet.

While various techniques and arrangements are described herein in relation to "packets", it is understood that these techniques and arrangements are also applicable to other connectionless data arrangements using, for example, "cells" and that packets and associated terminology can be used interchangeably with any such other corresponding terms.

DETAILED DESCRIPTION

Figure 1:
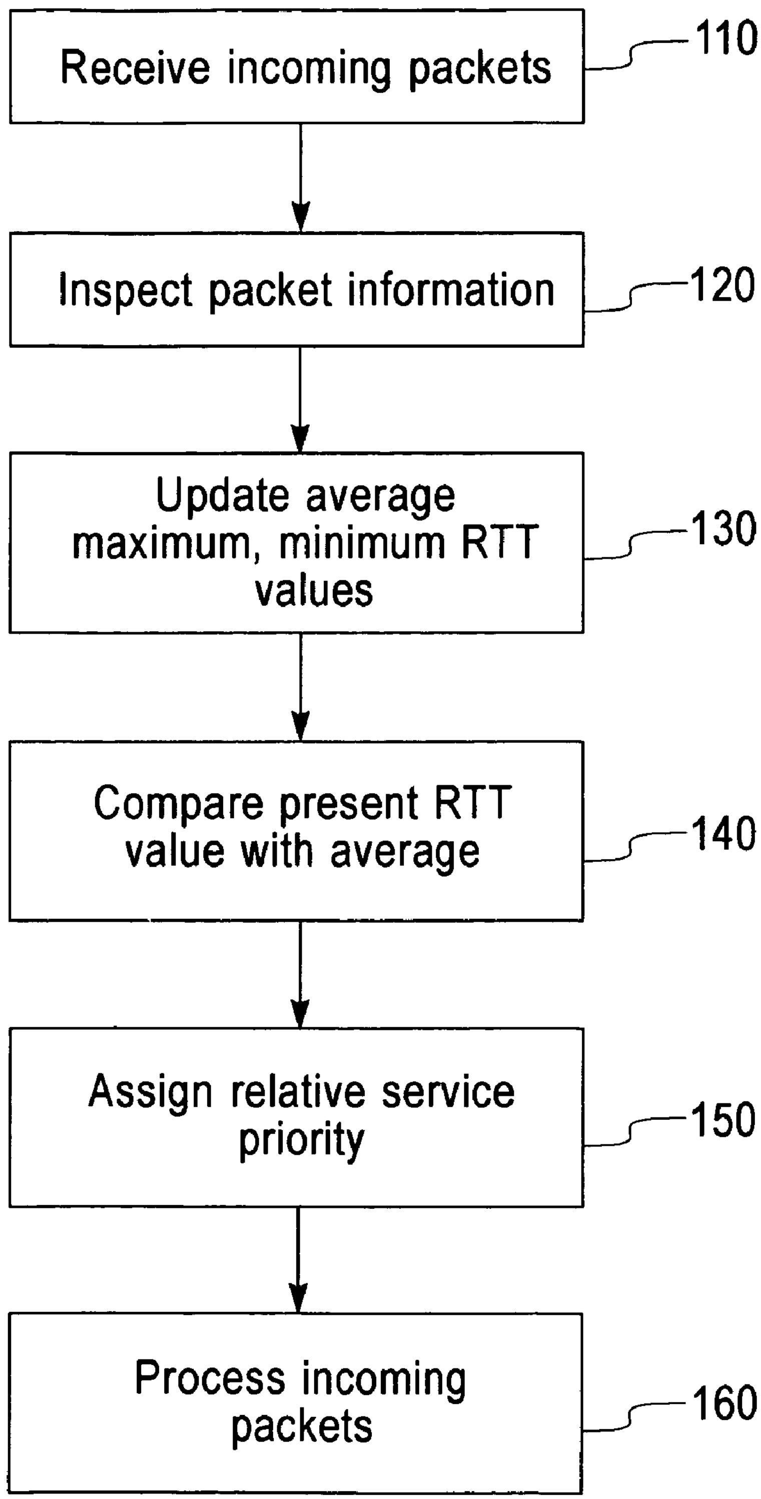
FIGS. 1 and 2 are flowcharts which each represent steps involved in performing steps of a traffic management algorithm for a packet-based network.

Techniques for packet management in a packet-based network are described herein. The described techniques can be implemented at a network node (for example, a gateway or router) which receives and forwards packets as they are passed through the packet-based network.

The Transmission Control Protocol (TCP) provides reliable, stream-oriented connections on packet-based networks. The Internet, and Ethernet implementations, use TCP/IP protocols that are based on TCP, which is in turn based on the Internet Protocol (IP). When a host transmits a TCP packet to a peer, it must wait a period of time for an acknowledgment by reply. If the acknowledgment reply does not come within an expected period, the packet is assumed to have been lost and the data is retransmitted. However, how long does one wait before retransmitting the packet? Over an Ethernet connection, no more than a few microseconds should be needed for a reply. If the traffic must flow over the wide-area Internet, a second or two might be reasonable during peak utilization times.

However, as this reasonable expected wait time is variable, TCP implementations monitor the normal exchange of data packets and develop an estimate of the time that should elapse before an acknowledgment is received. This estimate is termed the Round-Trip Time (RTT) estimation. RTT estimates are one of the most important performance parameters in a TCP exchange, especially as all TCP implementations typically experience packet drops due to congestion and must accordingly retransmit dropped packets, irrespective of link quality. If the RTT estimate is too low, packets are retransmitted unnecessarily. If the RTT estimate is too high, the network connection can remain idle unnecessarily, while the host waits to timeout.

A router typically has multiple packet connections passing through the router. Packets can be differentiated as being associated with "long" connections or "short" connections, based on packet header information. In this respect, IP packets in TCP networks have (at layer 3) a TTL (time to live) field. Further, a RTT (Round Trip Time) field can be transmitted by sources using, for example, the TCP option field or IP option field. As packets pass through the network node, these fields can be used to differentiate packets as being associated with long or short connections. Each of these packet header information fields, and their use, is discussed further below.

RTT Field Information

RTT is fundamental to timeout and retransmission functions in TCP. RTT experienced on a given connection for a TCP connection is the estimated time taken for a packet to reach its destination, and the corresponding acknowledgment return to the source. As routes or congestion can change over time, these times are monitored and RTT modified if warranted, as noted above.

The RTT can be used to differentiate different connections at a particular network node. The TCP option field may be used by the sender to send the RTT of the TCP connection. As RTT values for a connection do not change very frequently with time, the RTT values can be sent periodically within a predetermined period. In either case, even if a value of RTT is not included with each packet, a value can be inferred by correlating other characteristics (for example, source and destination IP addresses) with a packet for which RTT is known.

A running average RTT value for all packets is maintained at a network node, as well as a record of prevailing maximum and minimum values. For each arriving packet, a comparison is made between the RTT for that packet and the average. If the RTT is greater than average, the packet can be assigned a greater relative priority. If the RTT is lower than average, the packet can be assigned a lower relative priority.

TTL Field Information

The TTL field in an IP header sets an upper limit on the number of network routers through which a datagram can pass, thus limiting the potential lifetime of the datagram. The TTL field is initialised by the sender to some value. Different operating systems can assign different default TTL values, and TTL values can also vary from one version of TCP to another. Further, TTL values can be varied by appropriate network applications.

Accordingly, the TTL per se is not useful in determining the implied characteristics of a connection with which the packet is associated, as there is no reliable indication of the initial value of the TTL value. Instead, however, the "hopcount" (that is, the number of routers through which the packet has passed to reach the particular network node) can be determined by comparing the TTL field value in the packet header of the packet, with the initial TTL value stored in the packet header. The initial TTL value is stored in the IP option field.

This gives the number of "hops" (routers) through which the packet has passed. As packet routes through the Internet change infrequently, the hopcount is a relatively reliable indication of the connection with which the packet is associated. In other words, the hopcount can be used to meaningfully differentiate packet connections.

The calculated hopcount is stored in a register and indicates the number of nodes through which the packet has passed before arriving at the present network node. A running average hopcount is maintained at the node for all packets passing through that node. A record is also maintained of the maximum and minimum values of hopcount for packets through the node.

For each packet that passes through the node, hopcount information can be combined with other transmission duration information (such as RTT) to determine the relative service priority assigned to respective packets.

Assigned Priority and Allocated Drop Probability

In the two cases discussed above of TTL and RTT, packets are only classified as being of higher or lower priority, depending on the inference of whether the packet is associated with a longer or shorter connection respectively.

Desirably, RTT is used in conjunction with hopcount to determine whether the packet is associated with a long or short connection. A path through the network may have a low hopcount, but a large RTT associated with the packet, due to congestion. Similarly, another path may have a high hopcount but a low RTT, if there is little or no congestion. As there appears to be little correlation between hopcount and RTT in the Internet, it is advantageous that hopcount alone is not used to prioritize packets.

Relative service priority can be more finely graded than simply "lower" or "higher" priority. A whole range of statistical techniques and binning algorithms can be brought to bear on these and/or other packet header information values to assign relative priorities to packets passing through a network node.

EXAMPLE

FIG. 1 illustrates the steps that occur when RTT values are used to prioritise network traffic.

In step 110, the network node receives incoming packets from the network. The network node inspects the packet information associated with the incoming packets, in step 120. In step 130, the values for the average value, maximum value and minimum value of the RTT are updated using the new values of RTT taken from the incoming packets. These values are respectively maintained as Avg_RTT, Max_RTT and Min_RTT.

In step 140, the value of RTT for each incoming packet is compared with the corresponding average value of RTT. On this basis, packets are assigned a relative service priority in step 150. That is, if the packet has a greater than average RTT, then the packet is assigned a higher relative service priority, though if the packet has a lower than average RTT, then the packet is assigned a lower relative service priority.

When there is no packet congestion at a network node, the node operates in its usual manner. That is, all incoming packets are admitted to a packet buffer maintained for the purpose of temporarily storing then forwarding incoming packets.

However, when there is congestion detected at the node, packets with a lower assigned service priority are dropped in preference to packets with a higher assigned service priority. The packets are typically dropped before being admitted to the buffer maintained at the network node. (Packets can be dropped once stored in the buffer, but providing such functionality results in higher implementation overloads, involving pointer manipulations.)

Most simply, a FIFO algorithm is used to process packets stored in the buffer at the network node. Other scheduling algorithms can be used, if considered appropriate or desirable, though more sophisticated schemes necessarily involve additional complexity.

In some implementations, packets can be "marked" rather than dropped. Packets are "marked" on the same basis that they are "dropped". A marked packet, once it eventually returns to the node from which it was originally sent, is recognised as marked. In response, the source node shrinks the TCP window thereby possibly reducing congestion at the bottleneck node.

Drop Probability

As noted above, some packets are dropped before being admitted to a buffer. The buffer is essentially a queue in which packets are processed in a FIFO manner.

Figure 2:
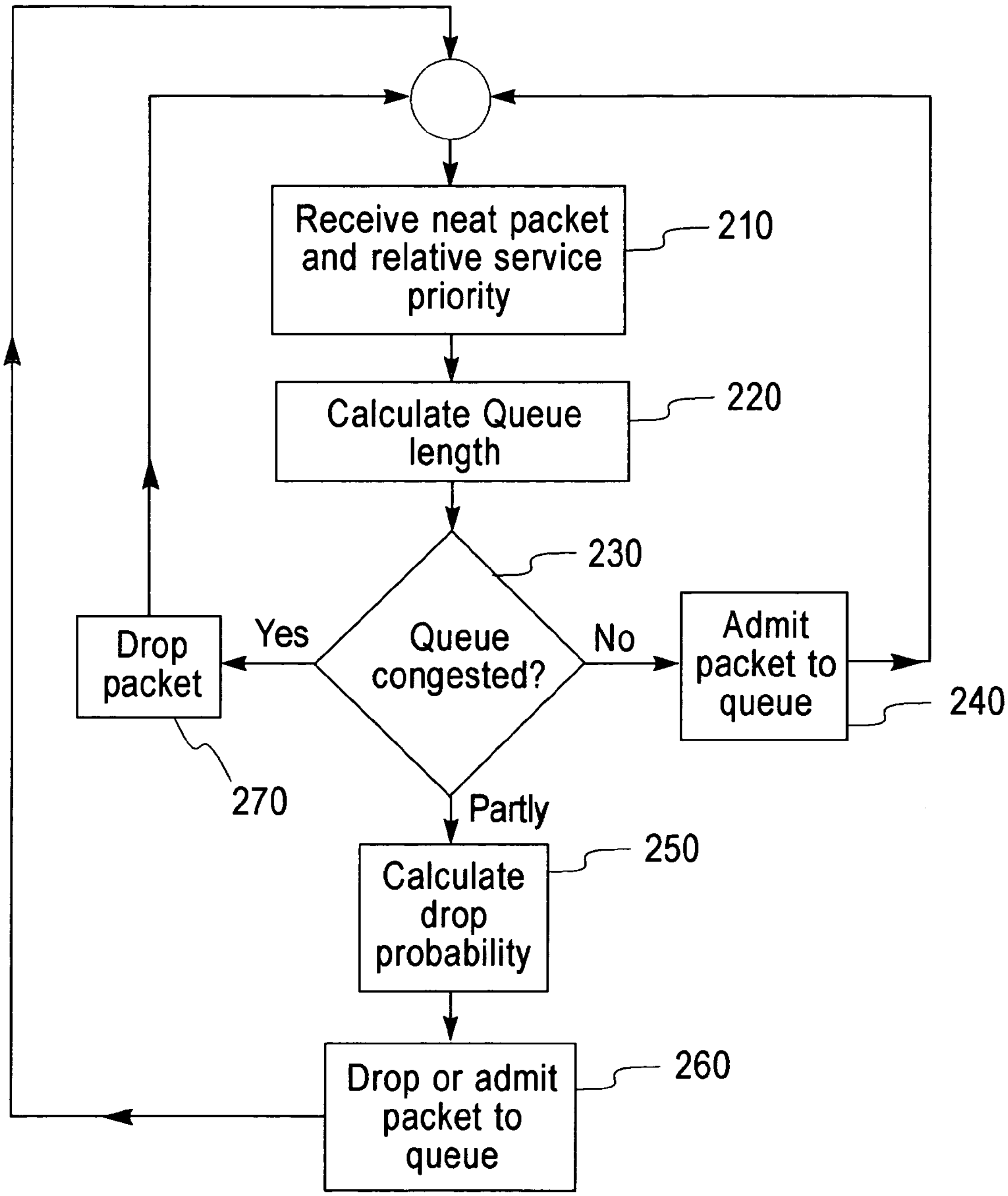

FIG. 2 is a flowchart representing the steps which occur once a relative service priority has been assigned, and before packets are queued in a buffer.

A packet and the associated relative service priority is received in step 210. The associated relative service priority is determined as described above with reference to FIG. 1. A check of the queue length is made (that is, the number of packets stored in the buffer) in step 220. In this respect, a record of the average queue length, AvgQ, is maintained, for the purpose described below. It is determined at this point, in step 230, whether the queue is congested.

If the average queue length at the node, AvgQ, is less than a minimum predetermined threshold, Min_q, then the queue is not congested. If the average queue length at the node, AvgQ, is greater than a maximum predetermined threshold, Max_q, then the queue is congested. If AvgQ is between these two predetermined thresholds; that is: Min_q<AvgQ<Max_q, then the queue is partly congested.

If the queue is not congested, the packet is admitted in step 240, and the process repeats from step 210. Similarly, if the queue is congested, the packet is dropped in step 270 and similarly the process repeats from step 210.

If the queue is partly congested, a drop probability P_drop, is calculated for the packet, as follows:

$$P\_drop = Max\_p \; (Max\_RTT - Avg\_RTT) / (Max\_RTT - Min\_RTT)$$

In the expression above for P_drop, the relevant terms are as follows:

- Max_p is a predetermined maximum drop probability, which is adjusted as required for packets of different relative service priority.
- Max_RTT is the maximum value of RTT for packets for a particular "connection".
- Min_RTT is the minimum value of RTT for packets for a particular "connection".
- Avg_RTT is the average value of RTT for packets for a particular "connection".

A random process is then implemented at the network node to determine whether the packet is to be dropped. Packets with higher relative service priority use a lower Max_p and thus have a lower calculated drop probability and are thus dropped less frequently.

The converse applies to packets with lower relative service priority, which have a higher Max_p and are thus sacrificially dropped to reduce queue congestion, while intelligently conserving network resources. That is, lower service priority packets (such as those with a relatively low average RTT) consume less network resources than higher service priority packets. Accordingly, a lower overall network performance penalty is paid by the network as a whole, if such lower service priority packets are preferentially dropped instead of higher service priority packets.

Once the packet is processed, by dropping the packet or admitting the packet to the buffer, the process returns again to step 210.

Network Hardware

The described techniques are implemented on network hardware elements that are located at network nodes. In this context, the network hardware or network node can be, for example, a router, gateway or any other form of programmable network hardware through which packets pass in a packet-based network.

In a TCP/IP network, the methods described above may be implemented in a router that receives packets from the network, and passes the packets on, after appropriate processing. In this respect, the network hardware executes software code that allows the network hardware to function as intended.

Figure 3:
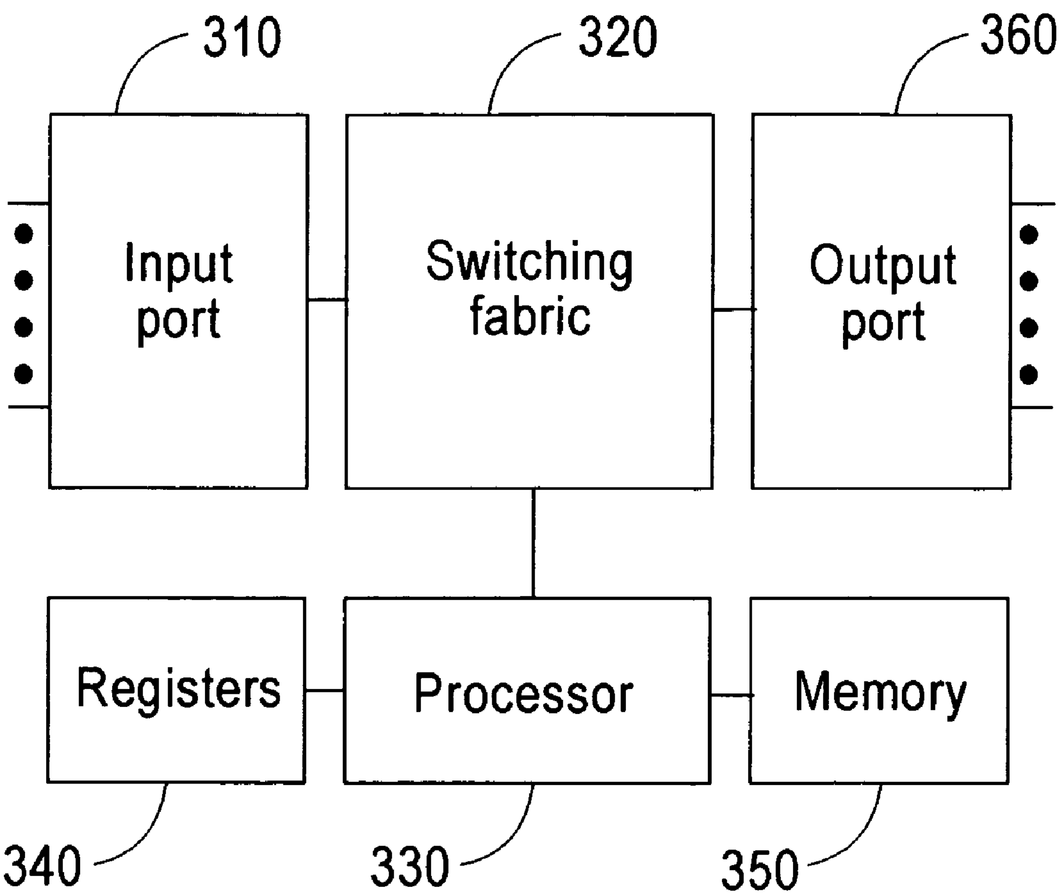
FIG. 3 is a schematic representation of a generic architecture for a network hardware element with which the algorithm represented in FIGS. 1 and 2 can be implemented.

A generic architecture for a suitable network hardware element is schematically represented in FIG. 3, for the case of a router.

The router has an input port 310, an output port 360, switching fabric 320, a processor 330, and associated registers 340 and memory 350. The input port 310 interfaces to the switching fabric 320, which is in turn interfaced to the output port 360. Incoming packets in the input port 310 are interrogated by the processor 330, which is connected to the switching fabric 320.

The processor 330, to which storage registers 340 and a memory 350 are operatively connected, executes a computer software program that is essentially control program stored in the memory 350. The registers 340 stores values obtained from the processor 330, during computation by the processor 330. The processor 330 operates the switching fabric 320 in accordance with the control program, for the ultimate purpose of routing incoming packets on the input port 310, through the switching fabric 320, to outgoing packets on the output port 360.

The processor 330 maintains a buffer of packets scheduled for output on the output port 360. Due to congestion, packets are queued at the output port 360 pending transmission in the manner described above.

It is understood that various alterations and modifications to the techniques and arrangements described can be made, as would be apparent to one skilled in the art.

I claim:

1. A method of handling packet traffic on a packet-based network, the method comprising:

receiving, at a network node, a flow of packets from the packet-based network;

determining, for each of the received packets, a metric at least partly based on the duration of transmission for the received packet;

calculating one or more statistical measures associated with values of said metric for the received packets, wherein the statistical measures include an average value;

assigning, to each of the packets, a relative service priority on the basis of the metric; and queuing one or more of the packets in a queue and transmitting the queued packets from the network node dynamically allocating a packet drop probability for one or more of the packets, based on the assigned relative service priority for the respective packets.

2. The method as claimed in claim 1, further comprising preferentially dropping packets that have a lower relative service priority in favor of packets that have a greater relative service priority, prior to the step of queuing of one or more of the packets.

3. The method as claimed in claim 1, further comprising marking packets that have a lower relative service priority, prior to the queuing of one or more of the packets.

4. The method as claimed in claim 1, further comprising dynamically allocating a packet drop probability occurs, prior to the queuing of one or more packets, wherein packets with a higher relative service priority are allocated a lower packet drop probability and packets with a lower relative service priority are allocated a higher packet drop probability.

5. The method as claimed in claim 4, wherein said dynamically allocating a packet drop probability is preformed if an avenge number of queued packets, at the network node, falls between maximum and minimum predetermined thresholds.

6. The method as claimed in claim 5, further comprising dropping packets if an average number of queued packets, at the network node, exceeds the maximum predetermined threshold.

7. The method as claimed in claim 5, further comprising admitting packets if an average number of queued packets, at the network node, falls below the minimum predetermined threshold.

8. The method as claimed in claim 1, wherein said metric comprises the value of time taken by the packet to traverse the network from the source to destination, and the packet's corresponding acknowledgment to traverse the network from the destination to source.

9. The method as claimed in claim 1, wherein said metric incorporates a hopcount representative of the number of nodes traversed by the packet from source of the packet to the network node.

10. The method as claimed in claim 9, wherein the statistical measures further include a maximum value and a minimum value.

11. The method as claimed in claim 9, wherein two classes of relative service priority, comprising a higher relative service priority and a lower relative service priority, are assigned to the received packets depending on a comparison of the metric with its corresponding average value for the received packets.

12. The method as claimed in claim 1, wherein the packet-based network transmits internet protocol (IP) packets.

13. The method as claimed in claim 12, wherein the packet-based network uses the transmission connection protocol (TCP).

14. The method as claimed in claim 13, wherein the metric comprises the value at the round trip time (RTT) field in the TCP packet header.

15. A method of handling packet traffic on a packet-based network, the method comprising steps of:

receiving, at a network node, a flow of packets from the packet-based network;

inferring, for each of the received packets, a connection characteristic at least partly representative of the duration of transmission for the received packet;

assigning, to each of the packets, a relative service priority on the basis of the inferred connection characteristic;

dynamically allocating a packet drop probability for one or more of the packets, based on the results of the assigned relative service priority; and queuing one or more of the packets in a queue and transmitting the queued packets from the network node.

16. The method as claimed in claim 15, further comprising preferentially dropping packets that have a lower relative service priority in favor of packets that have a greater relative service priority, prior to the queuing of one or more of the packets.

17. The method as claimed in claim 16, further comprising marking packets that have a lower relative service priority, prior to the queuing of one or more of the packets.

18. The method as claimed in claim 15, wherein packets with a higher relative service priority are allocated a lower packet drop probability and packets with a lower relative service priority are allocated a higher packet drop probability.

19. The method as claimed in claim 18, wherein said dynamically allocating a packet drop probability is preformed if an average number of queued packets, at the network node, falls between maximum and minimum predetermined thresholds.

20. The method as claimed in claim 19, further comprising dropping packets if an average number of queued packets, at the network node, exceeds the maximum predetermined threshold.

21. The method as claimed in claim 19, further comprising admitting packets if an average number of queued packets, at the network node, falls below the minimum predetermined threshold.

22. The method as claimed in claim 18, wherein a plurality of different classes of relative service priority are available to be assigned to the received packets depending upon the identity of the connection characteristic fir respective packets.

23. The method as claimed in claim 15, wherein the packet-based network transmits internet protocol (IP) packets.

24. The method as claimed in claim 15, wherein the packet-based network uses the transmission connection protocol (TCP).

25. A network node apparatus for handling packet traffic on a packet-based network, said apparatus including:

means for receiving, at a network node, a flow of packets from the packet-based network;

means for determining, for each of the received packets, a metric at least partly based the duration of transmission for the received packet;

means for comparing, for each of the received packets, said metric with a corresponding reference value;

means for assigning, to each of the packets, a relative service priority on the basis of the comparison;

means for dynamically allocating a packet drop probability for one or more of the packets, based on the results of the assigned relative service priority; and means for queuing one or more of the packets in a queue and transmitting the queued packets from the network node.

26. A network node apparatus for handling packet traffic on a packet-based network, said apparatus including:

means for receiving, at a network node, a flow of packets from the packet-based network;

means for inferring, for each of the received packets, a connection characteristic at least partly representative of the duration of transmission for the received packet;

means for assigning, to each of the packets, a relative service priority on the basis of the inferred connection characteristic;

means for dynamically allocating a packet drop probability for one or more of the packets, based on the results of the assigned relative service priority; and means for queuing one or more of the packets in a queue and transmitting the queued packets from the network node.

27. A computer software program, recorded on a medium and capable of execution by computing means able to interpret the computer software program, for handling packet traffic on a packet-based network, said computer software program comprising:

code means for receiving, at a network node, a flow of packets from the packet-based network;

code means for determining, for each of the received packets, a metric at least partly based the duration of transmission for the received packet;

code means for comparing, for each of the received packets, said metric with a corresponding reference value;

code means for assigning, to each of the packets, a relative service priority on the basis of the comparison;

code means for dynamically allocating a packet drop probability for one or more of the packets, based on the results of the assigned relative service priority; and code means for queuing one or more of the packets in a queue and transmitting the queued packets from the network node.

28. A computer software program, recorded on a medium and capable of execution by computing means able to interpret the computer software program, for handling packet traffic on a packet-based network, said computer software program comprising:

code means for receiving, at a network node, a flow of packets from the packet-based network;

code means for inferring, for each of the received packets, a connection characteristic at least partly representative of the duration of transmission for the received packet;

code means for assigning, to each of the packets, a relative service priority on the basis of the inferred connection characteristic;

code means for dynamically allocating a packet drop probability for one or more of the packets, based on the results of the assigned relative service priority; and code means for queuing one or more of the packets in a queue and transmitting the queued packets from the network node.

* * * * *